United States Patent
Jiang et al.

(10) Patent No.: US 7,827,584 B2
(45) Date of Patent: *Nov. 2, 2010

(54) METHOD AND SYSTEM FOR ADAPTIVE TRANSMISSION OF SMOOTHED DATA OVER WIRELESS CHANNELS

(75) Inventors: Zhimei Jiang, Eatontown, NJ (US); Leonard Kleinrock, Los Angeles, CA (US)

(73) Assignee: AT&T Intellectual Property II, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,213

(22) Filed: Dec. 9, 2008

(65) Prior Publication Data

US 2009/0154445 A1 Jun. 18, 2009

Related U.S. Application Data

(63) Continuation of application No. 10/814,466, filed on Mar. 31, 2004, now Pat. No. 7,464,395, which is a continuation of application No. 09/470,481, filed on Dec. 22, 1999, now abandoned.

(51) Int. Cl.
*H04N 7/173* (2006.01)
(52) U.S. Cl. .................... 725/116; 725/146; 725/62; 725/94

(58) Field of Classification Search .................... 725/54, 725/62, 86, 91–98, 115–116, 145–146; 348/397.1, 348/398.1, 487; 375/240.01–240.05; 370/412; 709/230–234
See application file for complete search history.

(56) References Cited

U.S. PATENT DOCUMENTS

| | | | | |
|---|---|---|---|---|
| 5,446,736 A | * | 8/1995 | Gleeson et al. | 370/473 |
| 5,481,312 A | * | 1/1996 | Cash et al. | 375/240.28 |
| 5,515,377 A | * | 5/1996 | Horne et al. | 370/395.64 |
| 6,014,694 A | * | 1/2000 | Aharoni et al. | 709/219 |
| 6,115,748 A | * | 9/2000 | Hauser et al. | 709/234 |
| 6,535,485 B1 | * | 3/2003 | Story | 370/231 |

OTHER PUBLICATIONS

Zhimei Jiang and Leonard Klienrock, "A General Optimal Video Smoothing Algorithm", Mar. 29, 1998, IEEE 0-7803-4383-2/98, pp. 676-684.*

* cited by examiner

*Primary Examiner*—Scott Beliveau
*Assistant Examiner*—Nicholas T Corbo
(74) *Attorney, Agent, or Firm*—Peter V. D. Wilde

(57) ABSTRACT

A method and system that reduces the impact of packet loss on video data quality. Packet selection is performed by the method and system to selectively drop low priority packets so that the overall quality of the received video data may be improved. In one exemplary embodiment, the probability of higher priority layers being delivered on time is computed and a packet is transmitted only if this probability is greater than a given threshold h. In another exemplary embodiment, the system and method have the capability of backing up the process to transmit previously skipped packets, if time allows.

9 Claims, 7 Drawing Sheets

METHOD AND SYSTEM FOR ADAPTIVE TRANSMISSION OF SMOOTHED DATA OVER WIRELESS CHANNELS

RELATED APPLICATIONS

This application is a continuation of application Ser. No. 10/814,466, filed Mar. 31, 2004, now U.S. Pat. No. 7,464,395, issued Dec. 9, 2008, which application is a continuation of application Ser. No. 09/470,481, filed Dec. 22, 1999, now abandoned.

FIELD OF INVENTION

This invention relates to data transmission over wireless networks. More specifically, the invention relates to reducing the impact of wireless channel instability on data streams by selecting data packets for transmission based on priority of the data packets.

BACKGROUND OF THE INVENTION

When a video data packet is delivered over a network, it typically shares the link with data packets and other audio/video data streams. As a result, if the available bandwidth is lower than that necessary to transmit the video data, long packet delay or even packet loss results. Various approaches have been proposed for adaptively transmitting and playing-out the video data based on network conditions to handle this type of situation and to reduce the impact of packet loss on video data quality.

In one conventional method, the play-out time at the player's end may be adjusted within a small range based on information about delay and the amount of data in a client buffer to prevent potential play-out discontinuity. See R. Ramjee, J. Kurose, D. Towsley and H. Schulzrinne, "Adaptive Playout Mechanisms for Packetized Audio Applications in Wide-area Networks," Proceedings IEEE INFOCOM '94 Toronto, Canada, 12-16 Jun. 1994, pp. 680-88 and M. C. Yuang, P. L. Tien and S. T. Liang, "Intelligent video smoother for multimedia communications," IEEE Journal on Selected Areas in Communications, February 1997, vol. 15, pp. 136-46.

Another conventional method implements an adaptive forward error control algorithm at a network node to reduce the packet loss rate. See J. C. Bolot and T. Turletti, "A Rate Control Mechanism for Packet Video in the Internet," Proceedings IEEE INFOCOM '94, Toronto, Canada, 12-16 Jun. 1994, pp. 1216-23 and J. C. Bolot and T. Turletti, "Adaptive Error Control For Packet video in the Internet," Proceedings of International Conference on Image Processing, Lausanne, Switzerland, September 1996, pp. 25-28.

Additionally, it is conventionally known that video data encoded using one standard may be transcoded to another standard that requires less bandwidth, thereby diminishing the problems of packet loss and diminished quality. See S. Achraya and B. Smith, "Compressed domain transcoding of MPEG," Proceedings IEEE International Conference on Multimedia Computing and Systems, Austin, Tex., June 1998, pp. 295-304.

In another conventional video data transmission method, the output rates are adjusted based on feedback information about the network at the video data source. See, J. C. Bolot and T. Turletti, "A Rate Control Mechanism for Packet Video in the Internet" and "Adaptive Error Control For Packet video in the Internet", referenced above. In particular, for real time video data transmission, parameters in the coding algorithm may be adjusted to generate video data at different rates. See E. Amier, S. McCanne and R. Katz, "Receiver-driven bandwidth adaptation for light-weight sessions," Proceedings ACM Multimedia 97, Seattle, Wash., USA, November 1997, pp. 415-26, B. Belzer, J. Liao and J. D. Villasenor, "Adaptive video coding for mobile wireless networks," Proceedings of $1^{st}$ International Conference on Image Processing, Austin, Tex., USA, November 1994, pp. 972-76, and H. Kanakia, P. P. Mishra, and A. R. Reibman, "An adaptive congestion control scheme for real time packet video transport," IEEE/ACM Transactions on Networking, December 1995, vol. 3, pp. 671-82. If the video data is pre-encoded, bit-streams may be scaled by cutting high frequency components, by requantization, or by re-encoding reconstructed pictures. See A. Eleftheriadis and D. Anastassiou, "Meeting arbitrary QoS constraints using dynamic rate shaping of coded digital video," Proceedings of the $5^{th}$ International Workshop on Network and Operating system support for Digital Audio and Video, Durham, N.H., USA, April 1995, pp. 95-106, S. Jacobs and A. Eleftheriadis, "Real-time dynamic rate shaping and control for Internet video applications," 1997 IEEE First Workshop on Multimedia Signal Processing, Princeton, N.J., USA, June 1997, pp. 558-63 and H. Sun, W. Kwok and J. Zdepski, "Architectures for MPEG compressed bitstream scaling," IEEE Transactions on Circuits and Systems for Video Technology, April 1996, vol. 6, :191-9.

However, these conventional methods are generally only marginally effective. Moreover, these conventional methods are even less effective in a wireless network and are not readily useful with smoothed video transmission.

SUMMARY OF THE INVENTION

The present invention solves these deficiencies by selectively delivering data packets to achieve a better overall video data quality. In performing data packet selection, the invention takes into consideration both channel conditions as well as the characteristics of the smoothed video data.

The present invention is most effective when practiced in conjunction with video smoothing. Video smoothing is the operation of pre-loading part of transmitted video data to a smoothing buffer at the client prior to play-out for the client. Although some of the above described conventional video data transmission methods may output video data that is slightly smoothed as a by-product of the video data transmission, none of the methods perform smoothing of the video data.

In a first exemplary embodiment of the invention, packet selection is performed to selectively drop low priority packets so that the overall quality of the received video data may be improved. The probability of higher priority layers being delivered on time is computed and a packet is transmitted only if this probability is greater than a set threshold.

In a second exemplary embodiment of the invention, packet selection is augmented with the capability of backing up the packet selection process to transmit previously skipped packets if time allows.

This invention performs transmission of video data more efficiently over a wireless network. The fluctuation of wireless channel conditions can add a significant amount of delay to video data packets and cause transmitted packets to miss their play-out time. If a video is smoothed, it is possible to selectively deliver packets delayed at the base-station to reduce the impact of the missing packets to the quality of the video data. In particular, the method and system developed in accordance with the exemplary embodiments of the invention determine whether to transmit a packet based on channel conditions as well as how likely higher priority layers in the rest of the video data may be delivered on time.

This invention also reduces the impact of packet loss on video data quality. For a fixed packet drop rate, the video data quality is improved by reducing the number of high priority packets being dropped.

Additionally, the invention intelligently selects packets to deliver so that a higher video data quality may be obtained when not all the packets can be transmitted on time.

By selecting a threshold h appropriately, in most cases, the invention can perform within 1-3% of the optimum result determined by the channel conditions and operation is significantly improved as the result of utilizing packet selection.

BRIEF DESCRIPTION OF THE DRAWING

The exemplary embodiments of this invention will be described in detail, with reference to the following figures, wherein.

DETAILED DESCRIPTION OF PREFERRED EMBODIMENTS

Figure 1:
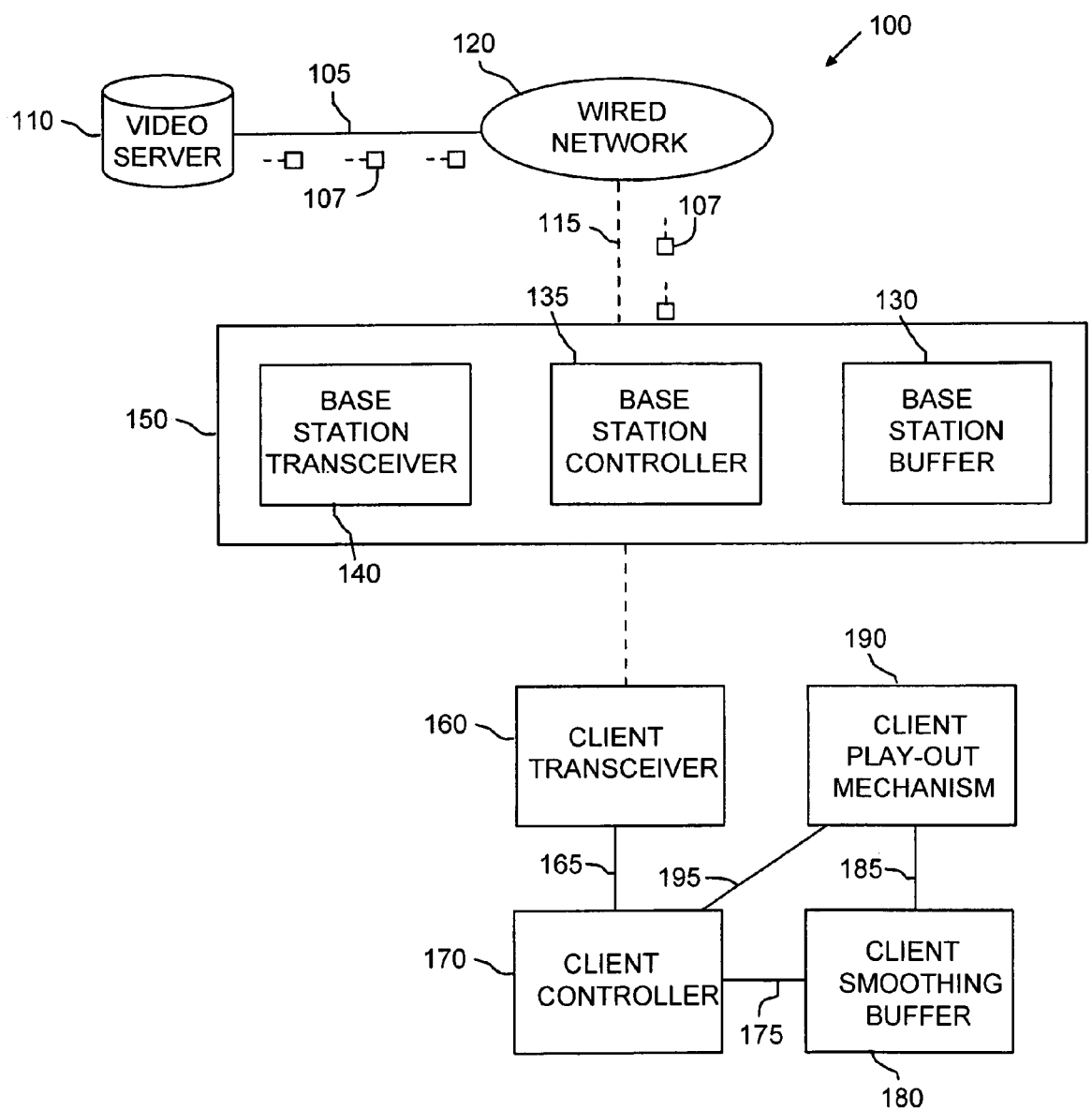
FIG. 1 illustrates a video data transmission system according to a preferred embodiment of the invention.

With a same amount of data, variable bit rate (VBR) encoding can generally achieve better video data quality than constant bit rate (CBR) encoding. However, efficient transmission of VBR video data has always been among the most challenging problems to network designers, largely because of the video data's high bandwidth demand, the quality of signal (QoS) requirements and the significant rate of variability.

In the present invention, video data smoothing is used as an effective way to reduce the variability of the bandwidth requirement for transmitting the video data, which can potentially simplify other operations such as resource allocation and improve network utilization.

Video data smoothing preloads part of the video data to a smoothing buffer at the client before play-out. After play-out has started, the rest of the video data may be transmitted in a less bursty fashion without compromising the quality of the video data. For given video data, video data smoothing generates the transmission schedule, which includes the rates at which the video data will be delivered during play-out, based on buffer size, available bandwidth and allowed play-out delay. A valid transmission schedule must guarantee that, given the bandwidth it requires, the smoothing buffer will not overflow or underflow during the entire play-out of the video data. Depending on the user's requirements, the smoothing algorithm may also need to optimize certain characteristics of the transmission schedule, such as peak rate, number of rate changes, etc.

When video data needs to be delivered over a wireless network, it becomes even more important to perform smoothing. Wireless channels typically have smaller capacity than wired links, which limits the gain provided from multiplexing. By reducing the burstiness of the bandwidth requirement through smoothing, more streams may be multiplexed on a channel. As a result, the improvement in network utilization of wireless networks can be greater than that of higher capacity wired networks.

In addition, smoothing may particularly improve the quality of the video data received through a wireless link. This is because the fluctuation of wireless channel conditions, e.g., the rate at which packets are successfully delivered over the wireless link, may sometimes be lower than their arrival rate from a wired link. When packets are delayed at the base-station for too long, they eventually miss their play-out time resulting in degradation of video data quality. If the video data is smoothed, the scheduling arrival time of a packet is normally earlier than its play-out time. Therefore, more delay at a base-station can be tolerated, and the packet drop rate may be reduced.

Additionally, using video data that is layer encoded, each layer is assigned a priority according to how important it is to the quality of the video data. Then for a fixed packet drop rate, the video data quality may be further improved by reducing the number of high priority packets being dropped. The present invention achieves such a goal. The method and system intelligently select packets to deliver so that a higher video data quality may be obtained when not all the packets can be transmitted on time.

The present invention utilizes the concept of quality index (QI) as an evaluation of the performance of transmission of data packets using the system and method. By selecting a threshold h appropriately, in most cases, the method and system can perform within 1-3% of the optimum result determined by the channel conditions and operation is significantly improved as the result of utilizing packet selection.

FIG. 1 outlines a video data transmission system according to an exemplary embodiment of the invention. The system 100 includes a video server 110, a wired channel 105, a wired network 120, a transmission channel 115, a base station 150 including a base station buffer 130, base station controller 135 and a base station transceiver 140, a wireless channel 155, a client transceiver 160 coupled to a client equipment controller 170 through link 165 and a client smoothing buffer 180 coupled to a client video data play-out mechanism 190 through a link 185. The controller 170 is linked to the client smoothing buffer through link 175 and coupled to the client video data play-out mechanism 190 through link 195.

Using the system 100 of FIG. 1, a smoothed video data stream is delivered to a remote client through a network path that is comprised of the wired 120 and the wireless channel 155.

The video data server 110 transmits the video data packets 107 along the wired channel 105 to the wired network 120. The wired network 120 is designed to have sufficient bandwidth for video data transmission. Thus, the wired network 120 does not adversely produce any delay jitter to the video data packets 107. The wired network 120 then transmits the video data packets 107 along a transmission channel 115, which is a wired link, to the base station 150. Within the base station 150, the base station transceiver 140 receives the data packets transmitted from the wired network 120.

The data packets 107 are received by the transceiver 140 and stored in the base station buffer 130 under the control of the base station controller 135. The base station controller 135 also performs packet selection steps to control selective transmission of packets, which it identifies as higher priority packets, along the wireless channel 155 to the client. The base station controller 135 controls transmission of the packets 107 so that the packets 107 are transmitted in the hierarchical order of their priority, with higher priority packets being transmitted before lower order packets within a single video frame. The base station controller 135 performs the selective transmission of packets 107 based on the conditions of the wireless channel 155 and a play-out schedule of each of the packets 107 within the video data. Delayed packets 107 are stored temporarily in the base station buffer 130 before being forwarded over the wireless link. Packet selection is performed by the base station controller 135 to determine which of the delayed packets to deliver. Packets which have missed their play-out time are removed from the buffer without being transmitted from the base station transceiver 140 to the client transceiver 160.

The wireless channel 155 delivers the packets 107 to the client transceiver 160 as fast as the channel conditions allow.

Once received by the client receiver 160, the client equipment controller 170 controls the client smoothing buffer to store the received packets 107 for smoothing until the scheduled play-out time of each packet. The client equipment controller 170 controls the client smoothing buffer 180 via link 175 to provide the data packets 107 to the client play-out mechanism 190 via 185 when the play-out time of the packets 107 is reached. The client equipment controller 170 controls the client play-out mechanism 190 via link 195 to play-out the received packets 107 according to the play-out schedule of the video data packets 107.

Assuming time is divided into time slots of constant length. Once play-out of a video, i.e., a plurality of video data packets, starts, exactly one video data frame is played at the beginning of every time slot. Each time slot is further divided into R mini-slots of equal length. At most one mini-packet may be delivered over the wireless link 155 in every mini-slot depending on channel conditions. If a packet 107 received from the transmission link 115 is larger than one mini-packet, it is split into several mini-packets which are transmitted one by one separately.

Figure 2:
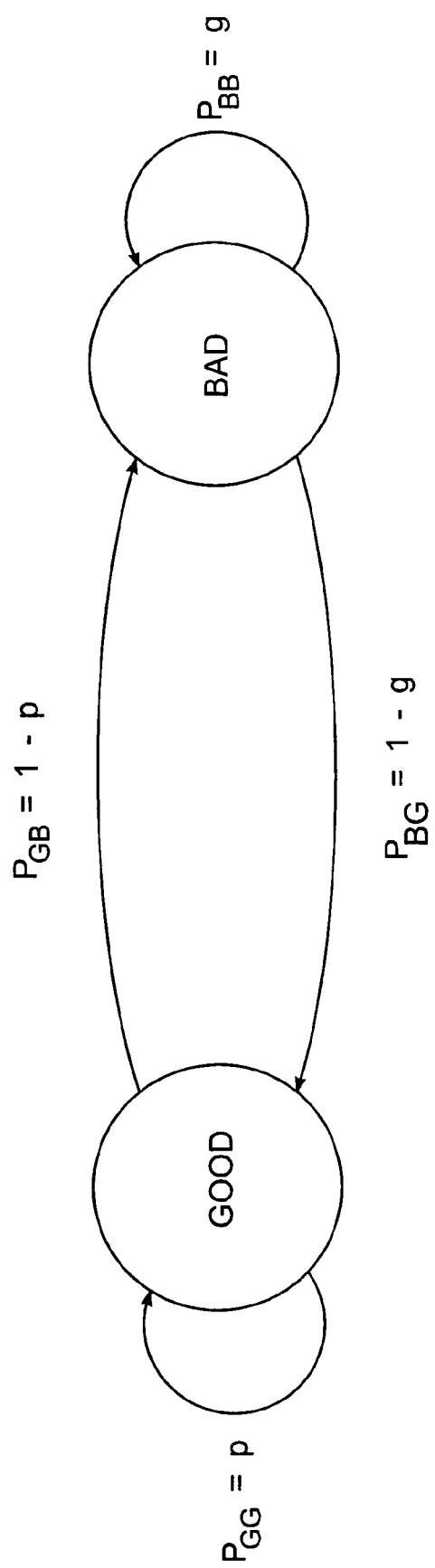
FIG. 2 illustrates a two state Markovian channel model.

Throughout the description of the invention, a two state Markovian channel model shown in FIG. 2 is used as an example. Specifically, the explanation of the invention relies on an assumption that, for each mini-slot, the wireless channel 155 is in one of the two possible states: GOOD (G) state and BAD (B) state. In state G, exactly one mini-packet can be transmitted in one mini-slot, while in state B, nothing can be transmitted. The channel 155 may switch between these two states with certain probabilities as shown in FIG. 2. For example, $P_{GG}$ is the probability that the next mini-slot will also be in state G given that the current mini-slot is in state G. The other three probabilities $P_{GB}$, $P_{BG}$ and $P_{BB}$ are defined similarly.

One constraint on the existing video data transmission system is that packets are always delivered in the same order as they are played and are dropped only if buffers within the network overflow. Thus, when packet dropping occurs, it usually affects a number of frames depending on the frame sizes and channel conditions. As a result, a client views video data with alternating good and bad periods. However, such viewing may not be the best from the client's point of view. For example, users typically prefer viewing stable black and white video data rather than viewing a color video data with part of or all of frames missing from time to time, even though the two may include the same quantity of data.

This preference on the visual effect allows us to improve the perceived video data quality without increasing the amount of data actually transmitted. Specifically, by predicting how the rest of the video data will be delivered, the system can selectively deliver more high priority packets by discarding lower priority ones in advance. It is preferred that this be done in such a way that the variation of video data quality may be kept as low as possible, and at the same time the quality itself may be kept as high as possible.

In order to achieve this goal, on the one hand, it is not effective to always transmit all the packets belonging to a frame before moving on to the next one because the low priority packets in the frame may cause some higher priority packets in the future frames to miss their play-out time.

On the other hand, it is not preferable to completely disregard lower priority packets and always transmit the highest priority packet in the buffer first. This is because in such a scheme, some lower priority packets would be skipped at the beginning of transmission, while the system is capable of transmitting packets. Potential results of such a scheme are that the system stays unnecessary idle and has nothing to transmit later on. Moreover, transmission of the lower priority data packets would have provided better quality video data.

Based on this observation, the present invention provides a method and system that is capable of data packet selection that balance the requirements of the viewing client and the channel conditions by choosing an appropriate threshold value h used as a measure of which data the base station sends the client.

In conjunction with the present invention, the frames are coded with a layered encoding algorithm and lower layers are identified as being more important, thus having higher priority. In addition, packets are sent from the server in the increasing order of their frame number and layer number. $L_{f,l}$ denotes layer l of frame f.

The core of the idea of packet selection may be described as follows. Assuming for convention that a packet currently at the head of the base-station buffer belongs to layer i of frame k, the packet from $L_{k,i}$ is transmitted, in the next mini-slot if and only if the probability that a layer will be delivered before its play-out time is greater than a given threshold h at the end of the next mini-slot for every higher priority layer in the rest of the video data. Otherwise, the rest of frame k is skipped and transmission of layer 0 of frame k+1 is commenced.

Figure 3:
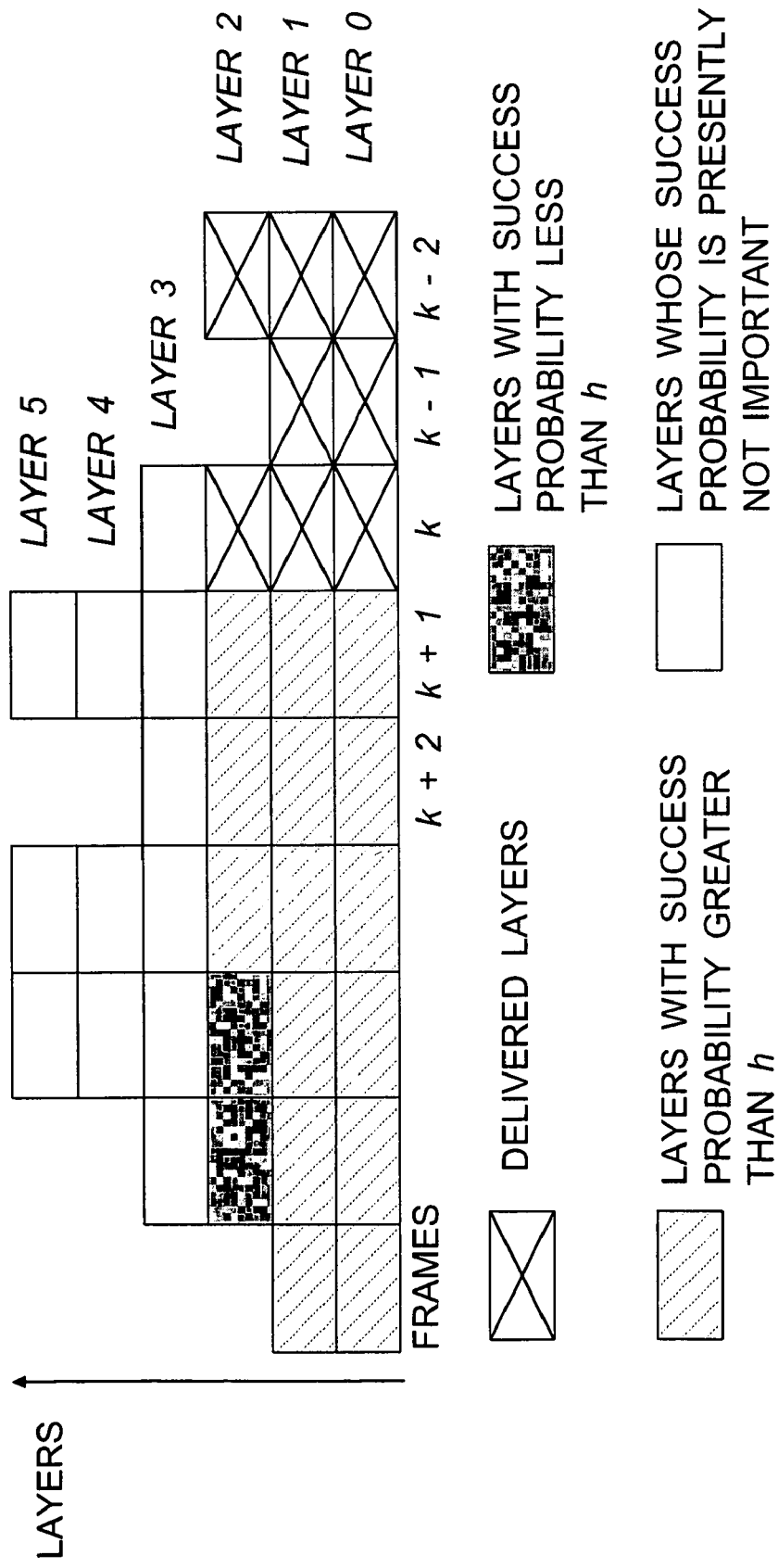
FIG. 3 illustrates a representation of a video data stream, where each column represents one frame while each row represents one layer.

Packet selection is performed at the end of every mini-slot to determine whether to transmit data in the next mini-slot. As an illustrative example, assume that FIG. 3 illustrates a representation of a video data stream, where each column k represents one frame while each numbered row represents one layer. The shade of a rectangle indicates the status of the layer in the corresponding frame. A frame does not have to include all layers and layers in different frames need not be of the same size (although they are drawn the same in the figure). At a given moment illustrated in FIG. 3, transmission of the data packets up to layer 2 of frame k has been completed, and the system needs to decide whether to continue to send a packet from layer 3 of frame k in the next mini-slot, or proceed to transmit the layers of frame k+1.

According to the present invention, a packet from $L_{k,3}$ is delivered if and only if higher priority layers in the rest of the video data, which in this case is layer 0 to 2 of all the frames with index greater than k, may still be transmitted before their play-out time with probability greater than h at the end of the next mini-slot.

As packet selection is explained in more detail, the term success probability must be explained. The success probability of layer l of frame f which is denoted by $SP_{f,l}$, is defined as the probability that layer l of frame f may be transmitted before the play-out time given that the system will also deliver as much as possible of up to layer l of all the frames between f and the current frame. Note that the value of $SP_{f,l}$ is based on an assumption that the system also tries its best to transmit layer 0 to l of all the frames before f that have not been delivered so far. Based on this explanation of success probability $SP_{f,l}$, the packet selection method and system may be further described as follows.

Assuming that a packet currently at the head of the base station buffer 130 belongs to layer i of frame k, the packet is transmitted from $L_{k,i}$ in the next mini-slot if and only if $SP_{f,l}>h$ for all $k+1 \leq f \leq N$ and $0 \leq l \leq i-1$ at the end of the next mini-slot. N is the total number of frames. In other words, the packet from $L_{k,i}$ is transmitted in the next mini-slot if and only if it will not cause the success probability $SP_{f,l}$ of any higher priority layers to fall below the threshold h.

Since $SP_{f,l1}<SP_{f,l2}$ for any l1>l2, it is sufficient to merely consider whether $SP_{f,i-1}>h$ for all $k+1 \leq f \leq N$. Thus, the core of the method of performing packet selection may be even more simply explained as follows. Assuming that the packet currently at the head of the base-station buffer 130 belongs to layer i of frame k, the packet is transmitted from $L_{k,i}$ in the next mini-slot if and only if $\min\{SP_{f,i-1}/k+1 \leq f \leq N\}>h$ at the end of the next min-slot.

This evaluation is performed at the end of each mini-slot to determine which layer of which frame to transmit in the next mini-slot. Again, assuming the next packet in the video data stream sequence belongs to $L_{k,i}$, the following explanation of the operation of packet selection will now be explained with reference to FIG. 4.

If frame k will be played before the end of the next mini-slot, transmission of the rest of frame k is skipped and the method begins transmitting the data of layer 0 of the next frame, which may still reach the client before its play-out time. Otherwise, further evaluation is needed to decide whether this packet from $L_{k,i}$ should be delivered next.

If i=0, the packet is transmitted. In the method, layer 0 is always transmitted unless it has already missed its play-out time. If i>0, as described above, depending on whether $\min\{SP_{f,i-1}/k+1 \leq f \leq N\}>h$ holds, either a packet in $L_{k,i}$ or one from $L_{k+1,0}$, is transmitted in the next mini-slot. This last case is the focus of packet selection.

Returning to the example shown in FIG. 3, since at least layer 2 of two frames after k have success probability $SP_{f,l}$ less than h, the packet from $L_{k,3}$ will not be delivered. Instead, the system starts sending packets from layer 0 of frame k+1.

The method illustrated in FIG. 3 is performed at the end of every mini-slot. Those packets that have been skipped for transmission are removed from the base-station buffer 130 immediately to allow room for newly received packets from the wired network 120 along transmission channel 115 to be processed.

One layer of a frame may need to be split into several mini-packets, each of which is transmitted in one mini-slot when the channel condition is good. If the channel is in an undesirable state, a packet may not be delivered in one mini-slot. Subsequently, the packet will remain at the head of the buffer and will be re-transmitted if the conditions in the packet selection method are still satisfied for the next mini-slot. Otherwise the packet is dropped and the system starts sending a new frame.

Two key parameters which determine the performance of packet selection are the success probability $SP_{f,l}$ and the threshold h. Therefore, accurately computing the success probability $SP_{f,l}$ and properly selecting the threshold value h is necessary to achieve better performance.

During packet selection, it is necessary to calculate the value of success probability $SP_{f,l}$ for all $k+1 \leq f \leq N$ to decide whether to transmit a packet from $L_{k,l+1}$. However, it is very difficult to compute the exact value of $SP_{f,l}$ because $SP_{f,l}$ is computed based on the assumption that the system will try to send up to layer l of all the frames between k and f. Nevertheless, two things might actually happen to an intermediate frame, e.g., j, where k<j<f. First, if transmission of data up to layer l of the frame is performed before the corresponding play-out time of that data, the controller 135 controls the transceiver 140 to start transmitting frame j+1 immediately after $L_{j,l}$ is finished. Alternatively, if frame j is played before the data up to layer l of the frame can be transmitted completely, the controller 135 controls the buffer 130 to discard the rest of j and the transceiver 140 to start sending frame j+1 in the next mini-slot. Therefore, computation of $SP_{f,l}$ involves considering these two cases for every intermediate frame j, corresponding to whether the previous frame, j−1, is finished before its play-out time.

As the number of frames increases, the complexity of this computation increases exponentially. Therefore, for a long video data stream, it is virtually impossible to compute the exact value of $SP_{f,l}$ for every remaining frame at the end of every mini-slot. Therefore, estimation of success probabilities must be performed.

It should be apparent from the discussion above that the difficulty of finding a success probability stems from the dependence of success probability $SP_{f,l}$ on the exact sequence of the channel states, which is unknown in advance. However, if the probability distribution of channel states is known to some degree, the value of $SP_{f,l}$ may be estimated by predicting the channel conditions in the future. Therefore, a final estimation of the minimum success probability is calculated as follows.

Figure 4:
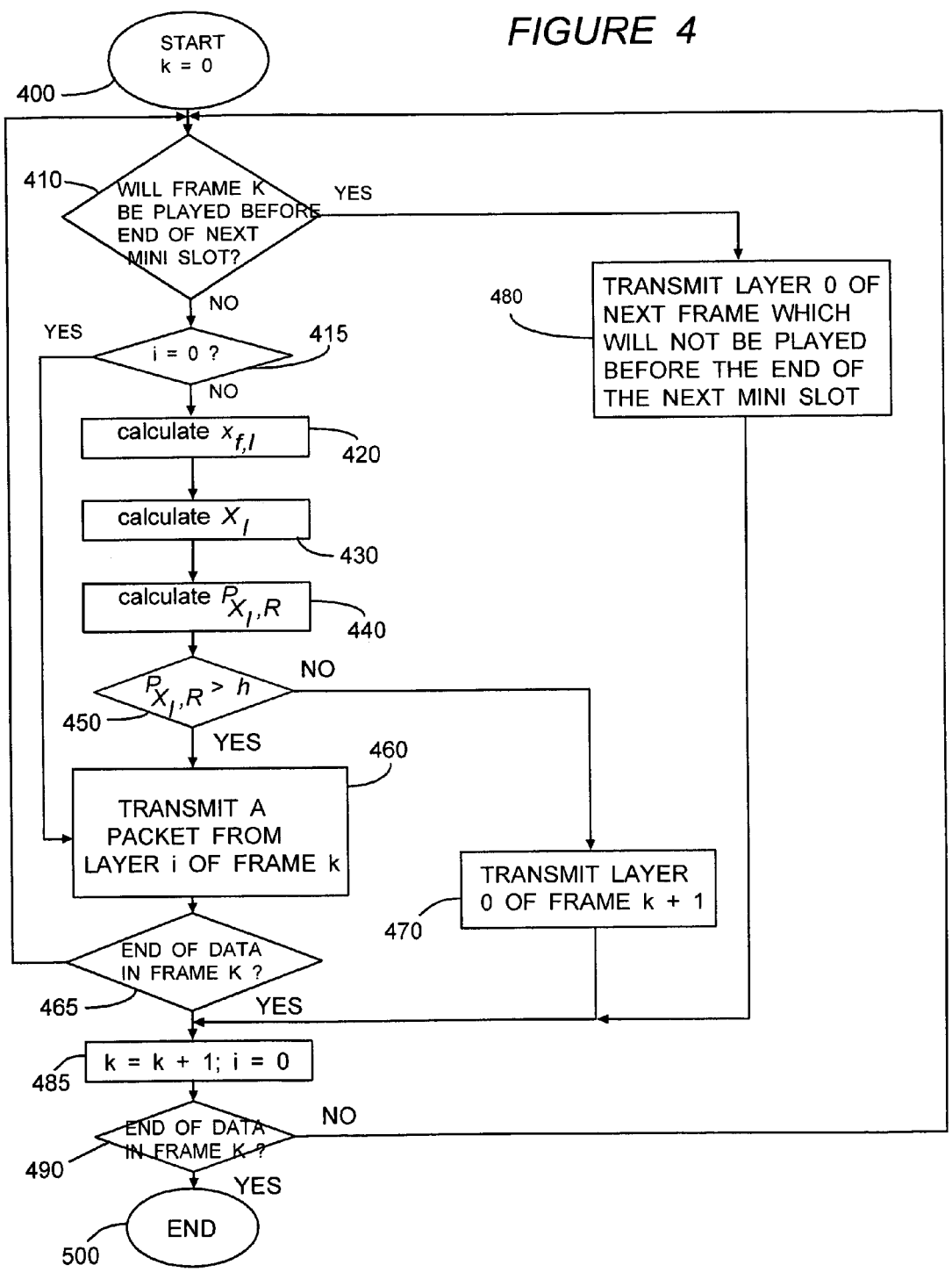
FIG. 4 illustrates an exemplary method of determining whether to transmit a packet by estimating the value of success probability as used in the first exemplary embodiment.

A determination may be made, based on the success probability of layer l of frame f, $SP_{f,l}$, whether to transmit a packet from $L_{k,l+1}$. FIG. 4 illustrates an exemplary method of determining whether to transmit a packet from $L_{k,l+1}$ by estimating the value of success probability $SP_{f,l}$. $SP_{f,l}$ is calculated using $P_{A_{f,l},M_f}$. $P_{A_{f,l},M_f}$ denotes the probability that at least $A_{f,l}$ mini-packets are transmitted in $M_f$ mini-slots. $A_{f,l}$ denotes the amount of data up to layer l from frame k+1 to f, that is, $$A_{f,l} = \sum_{i=k+1}^{f} \sum_{j=0}^{l} s_{i,j},$$

where $s_{i,j}$ is the size of layer j of frame i. $M_f$ denotes the number of mini-slots left before the play-out time of frame f from the end of the next mini-slot.

For a long video data stream, e.g., longer than 100 frames, computation of $P_{A_{f,l},M_f}$ is difficult because both $A_{f,l}$ and $M_f$ can be very large. Therefore, calculations are performed based on an assumption that one frame is played in every time slot which is comprised of R mini-slots. When both $M_f$ and R are reasonably large, say greater than 10, $P_{A_{f,l},M_f}$ is very close to $P_{x_{j,l},R}$. $x_{f,l}$ denotes the average number of packets that must be transmitted in R mini-slots to send at least $A_{f,l}$ packets of $M_f$ mini-slots, that is $$x_{f,l} = \left\lceil \frac{A_{f,l}R}{M_f} \right\rceil.$$

$P_{x_{f,l},R}$ may be calculated based on the $x_{f,l}$. The minimum success of probability, $P_{A_{f,l},M_f}$ may be estimated using $P_{x_{f,l},R}$.

As illustrated in FIG. 4, the method begins in step 400 and control proceeds to step 410. In step 410, it is determined whether frame k will be played before the end of the next mini slot. If frame k will be played before the end of the next mini slot, control proceeds to step 415.

Otherwise, control proceeds to step 480. In step 480, transmission occurs for layer 0 of the next frame that will not be played before the end of the next mini slot and control proceeds to step 485.

In step 415, it is determined whether i=0, indicating that the layer is layer 0. If i=0, control proceeds to step 460. If i is not equal to 0, control proceeds to step 420. In step 420, $x_{f,l}$ is calculated and control proceeds to step 430. During packet selection, the minimum value among all the success probabilities for layer 1 of frames after the current one is calculated. Since for any frame f, $SP_{f,l}$ may be estimated based on $P_{x_{f,l},M_f}$ instead of computing all the success probabilities and then taking the minimum, step 430 determines the maximum average number of packets necessarily transmitted in one time slot, $X_l$, i.e., $X_l = \max\{x_{f,l} | k+1 \leq f \leq N\}$ and control proceeds to step 440. In step 440, $P_{X_l,R}$ is determined as the estimation of the minimum success probability $P_{A_{f,l},M_f}$ and control proceeds to step 450. Thus, $P_{X_l,R}$ is used to estimate the minimum of $SP_{f,l}$ for all $k+1 \leq f \leq N$.

In step 450, a comparison of $P_{X_l,R}$ with a threshold h is performed to decide whether to transmit this packet or start sending a next frame. If $P_{X_l,R}$ is higher than the threshold h, control proceeds to step 460. Otherwise, control proceeds to step 470. In step 470, layer 0 of frame k+1 is transmitted and control proceeds to step 485. In step 460, the packet from layer i of frame k is transmitted and control proceeds to step 465. In step 465 it is determined whether any more data remains in frame k to be transmitted. If so, control returns to step 410. If not, control proceeds to step 485, in which k is incremented to the next frame and i is reset to 0. Control then proceeds to step 490.

In step 490, it is determined whether a next packet is available for transmission. Step 490 serves the purpose of determining whether the end of the video data has been reached. In step 490, if there is remaining data to be transmitted, control returns to step 400. If step 490 determines that there is no remaining data to be transmitted, control proceeds to step 500 in which the method ends until additional video data is transmitted to the base station 150.

Figure 5:
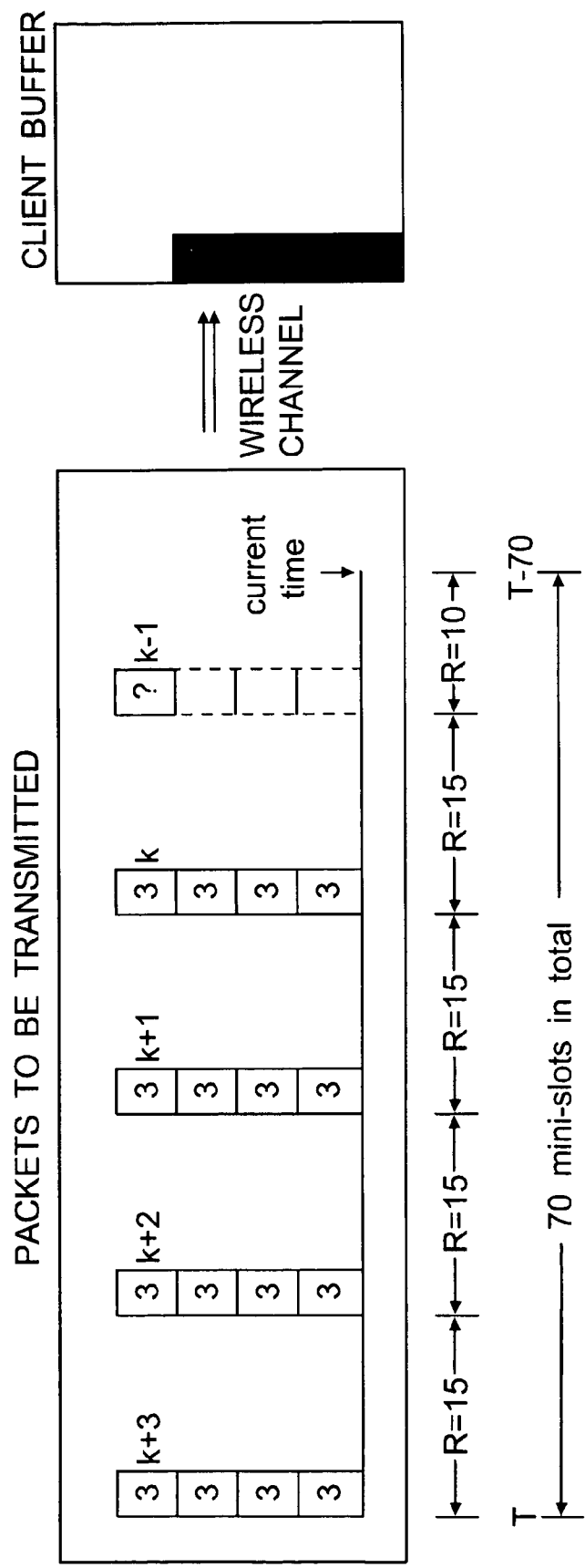
FIG. 5 shows exemplary constant bit rate video data used to illustrate the application of the exemplary embodiments.

To further illustrate how the minimum success probability is calculated, a simple example is provided and illustrated in FIG. 5. Assume there are only four frames left in a constant bit rate video data stream, the video data has four layers and each layer includes three packets. In addition, assume the play-out time of the last frame is T, the current time is T−70, and R=15. A determination must be made whether to transmit a packet from layer 3 of the current frame, frame k−1, or to start transmitting frame k. Since the frame sizes are the same, the maximum average number of packets transmitted in one time slot, $X_2$, can be obtained by averaging all the remaining packets and dividing that average by the total number of remaining mini-slots. In other words, the minimum success probability must be $P_{x_{k+3,2},15}$. Assuming the system will try to deliver a packet from $L_{k−1,3}$ in the next mini-slot, then at the end of the next slot $M_{k+3}=69$ and $$A_{k+3,2} = \sum_{i=k}^{k+3} \sum_{j=0}^{2} s_{i_j} = 4*3*3 = 36.$$

Thus, $$X_2 = x_{k+3,2} = \left\lceil \frac{A_{k+3,2}R}{M_{k+3,2}} \right\rceil = \lceil 7.84 \rceil = 8.$$

Subsequently, a comparison of $P_{8,15}$ with the threshold h is performed to decide whether to transmit this packet or start sending frame k.

Figure 6:
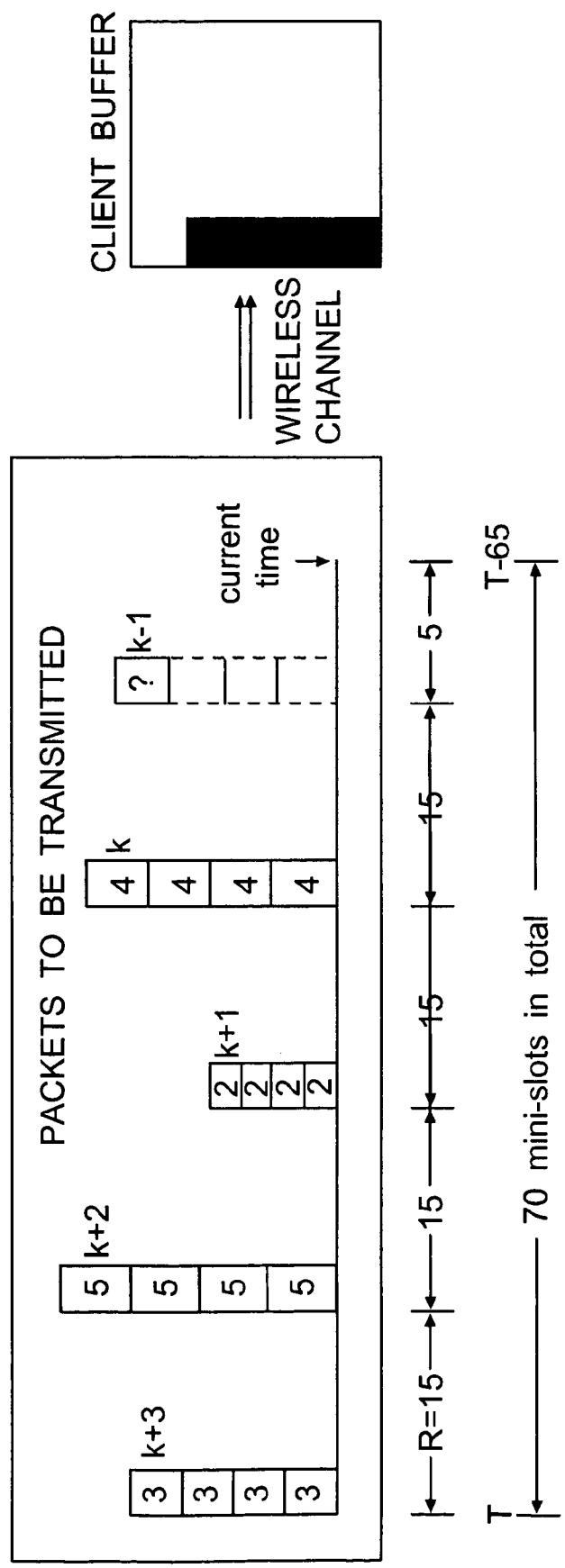
FIG. 6 shows exemplary variable bit rate video data used to illustrate the application of the exemplary embodiments.

If frames are of different sizes, it is generally more difficult to find the highest average rate needed. Consider the VBR video data shown in FIG. 6, where again there are only four frames left and a determination must be made whether to transmit a packet from $L_{k−1,3}$. Each frame has four layers, the number of packets included in each layer is labeled in FIG. 6.

Assume the play-out time of the last frame is T, the current time is T−65, and R=15. If a packet from $L_{k−1,3}$ is indeed delivered in the next mini-slots, then at the end of next mini-slots, the values of $X_{f,2}$ for the remaining four frames are $x_{k,2} = \lceil 12*15/19 \rceil = \lceil 9.47 \rceil = 10$ $x_{k+1,2} = \lceil (6+12)*15/34 \rceil = \lceil 7.94 \rceil = 8$ $x_{k+2,2} = \lceil (15+6+12)*15/49 \rceil = \lceil 10.10 \rceil = 11$ $x_{k+3,2} = \lceil (9+15+6+12)*15/64 \rceil = \lceil 9.84 \rceil = 10$ The maximum of the four is $x_{k+2,2}$, thus $X_2 = x_{k+2,2} = 11$.

If the current time is T−79, $x_{k,2}$ to $x_{k+3,2}$ can be computed similarly. However, in this example, $x_{k+2,2} = \lceil (15+6+12)*15/63 \rceil = \lceil 7.85 \rceil = 8$ is less than $x_{k+3,2} = \lceil (9+15+6+12)*15/78 \rceil = \lceil 8.08 \rceil = 9$. Therefore, $X_2 = x_{k+3,2} = 9$.

Clearly, the value of $x_{f,l}$ changes every mini-slot. However, recomputing $x_{f,l}$ from scratch at the end of each mini-slot can be very time consuming. To simplify the computation, a maximum average rate $w_{f,l}$ is pre-calculated for all $0 \leq f \leq N$ and $0 \leq l \leq L$, where $w_{f,l} = \max\{x_{i,l} | f \leq i \leq N\}$, and $x_{i,l}$ is computed with the assumption that the system does not start to transmit frame f until the frame f−1 has been played. During the play-out and when computing $X_l$, $x_{f,l}$ is compared with the pre-calculated average $w_{f+1,l}$, and calculation is ceased at the point where $x_{f,l}$ is greater than $w_{f+1,l}$. For instance, in the above VBR video data example, the $w_{f,2}$ for the last four frames are:

$$w_{k,2} = \min\{12, \lceil (6+12)*15/30 \rceil, \lceil 15+6+12)*15/45 \rceil,$$
$$\lceil (9+15+6+12)*15/60 \rceil\}$$
$$= \min\{12, 9, 11, \lceil 10.5 \rceil\} = 12$$
$$w_{k+1,2} = \min\{6, \lceil (15+6)*15/30 \rceil, \lceil (9+15+6)*15/45 \rceil\}$$
$$= \min\{6, \lceil 10.5 \rceil, 10\} = 11$$
$$w_{k+2,2} = \min\{15, \lceil (9+15)*15/30 \rceil\} = \min\{15, 12\} = 15$$
$$w_{k+3,2} = \min\{9\} = 9$$

If the current time is T−65, then $x_{k+2,2}=11>w_{k+3,2}=9$. Therefore, $X_2=x_{k+2,2}$. Accordingly, there is no need to compute $x_{k+3,2}$. If the current time is T−79, $x_{i,2}<w_{i+1,2}$, for all $k\leq i\leq k+2$. Thus, $X_2$ must be equal to $x_{k+3,2}$. More simplifications are possible by taking advantage of the $x_{f,l}$ computed for the previous mini-slot.

To complete the computation of success probability $SP_{f,l}$, the only thing remaining is to calculate $P_{X_l,R}$, the probability that at least $X_l$ mini-packets are transmitted in R mini-slots, where $X_l$ is the maximum average packet rate defined above and R is the number of mini-slots in a time slot. It is conventionally known how to analyze the delay distribution of a wireless system in which the channel is modeled as a two state Markov chain such as that illustrated in FIG. 2. The result of such analysis shows that, for such a channel model, $P_{X_l,R}$ is given by:

$$P_{X_l,R} = \sum_{i=X_l}^{R} \frac{D_{G,R^{(0)}}^{(i)}}{i!} \quad (1)$$

where $$D_{G,R^{(z)}} = \frac{1}{2} + \frac{2\bar{p}+zp-q}{2\sqrt{F}}\left(\frac{E+\sqrt{F}}{2}\right)^R + \left(\frac{1}{2} - \frac{2\bar{p}+zp-q}{2\sqrt{F}}\right)\left(\frac{E-\sqrt{F}}{2}\right)^R$$

with $E=zp+q$ and $F=(zp-q)^2+4z\overline{pq}$ both being functions of z, p and q and both being transition probabilities shown in FIG. 2. In a memory-less system, where $p=1-q$, equation (1) can be simplified to:

$$P_{X_l,R} = \sum_{i=X_l}^{R} \binom{R}{i} p^i (1-p)^{R-i} \quad (2)$$

For other channel models, $P_{X_l,R}$ may be computed accordingly or through actual measurement, while packet selection and the way success probability is estimated remain the same.

Having described packet selection as well as how to compute the success probability $SP_{f,l}$, evaluation of the performance of the packet selection method under various channel conditions will be discussed.

One goal of the present invention is to achieve better video data quality using the above-described packet selection technique. Simulations were conducted to investigate the performance and possible improvements of this technique.

In these simulations, the transmission performance was measured by QI. It was assumed that every packet in the video data stream was assigned a weight. Generally the higher the packet's priority, the higher its weight. The quality of a video data stream played at the client was calculated as the summation of the weight over all the received packets. Similarly, after each simulation, given the actual sequence of channel states during the entire play-out, the best quality that may be obtained for the same video data during the same period was calculated.

Finally, the QI of the played video data was calculated by the ratio of its quality to the computed best achievable quality. Clearly, the higher QI, the better the transmission. And the highest QI achievable is 1. If a fixed number of packets are transmitted, the more high priority packets are included, the better the received video data quality and the higher the QI.

Note that QI does not indicate the video data quality directly, it is only an indication of how well the packet selection method improves video data transmission and the quality of the received video data compared to the best one may be obtained with the same sequence of channel states.

In these simulations, it was assumed that the weight of layer i packet is N−i, where N is the total number of layers. For instance, for video data with three layers, layer 0 was assigned weight 3, layer 1 packet has weight 2, and layer 2 packet has weight 1.

Again, the wireless channel was modeled as a general two state Markov chain shown in FIG. 2. To obtain different network conditions, the transition probability $p_{GG}$ was fixed and the other probability $p_{BB}$ was adjusted to obtain different system loads. The value of $p_{GG}$ was varied repeatedly and the same procedure was repeated several times.

The simulations were conducted using computer generated CBR video data as well as real video data traces. The video data is assumed to have three layers each with equal sizes within a frame. A smoothed transmission schedule with minimum peak rate was used to schedule output packets. The resulting peak rate was 14 k bits per frame. Data were delivered at this peak rate whenever such delivery would not cause data overflow. Otherwise, a rate that made the smoothing buffer just full is employed. A bandwidth of 14 k bits per time slot was assumed to be reserved on the path from the server to the user. The system load was calculated to 90.6% if the wireless portion of the path was at G state during the entire play-out. Depending on the value of $p_{GG}$, and $p_{BB}$ used in a simulation, the actual load, which was only referred to the load of the wireless link, was larger and could have been even greater than one. In fact, situations where the load was close to or greater than one were most interesting since packet selection will be most needed in these cases.

The simulations will now be explained in detail as they apply to the application of transmitting video data streams. Assume the first 25 frames were preloaded to the client buffer before play-out. Once play-out started, one frame was played at the beginning of every time slot, which was divided into 28 mini-slots. One mini-packet was sent over the wireless channel every mini-slot and one regular packet was sent from the video server every 4 mini-slots, where the size of a mini-packet was 500 bits and that of a regular packet 2000 bits or lower depending on the actual transmission rate. Equation (1) and (2) were used to estimate the value of success probability $SP_{f,l}$ with R=28.

The performance of any method or system for packet selection largely relies upon the threshold h used. Therefore, the relationship of the performance and the chosen threshold h will now be explained under various network conditions. Specifically, the value of $p_{GG}$ was varied from 0.01 to 0.91 in steps of 0.1 and the case with $p_{GG}=0.99$ was also considered. Also, for a fixed $p_{GG}$, the value of $p_{BB}$ was adjusted to obtain different network loads.

For each pair of $p_{GG}$ and $p_{BB}$, the transmission performance was investigated by measuring the output video data's QI using five different thresholds h=0.1, 0.5, 0.7, 0.9 and 0.99. Results indicate that the transmission performance, first increases as the threshold h increases, then as the threshold h approaches one, it starts to decrease. This is an expected result because, with a small threshold value h, the packet selection system tends to transmit more packets for each frame before advancing to the next one. This means by the time the system is ready to transmit later frames, it may not have enough time for even their high priority components. Therefore, some high priority packets may not be delivered because the system spent too much time on the earlier lower priority packets. Therefore, the performance of the system may be improved.

As the threshold value h increases, less low priority packets are transmitted which leaves more room for higher priority packets behind them, thus the performance improves and the QI increases. However, if threshold h continues to increase, the system approaches the other extreme state. It becomes more and more likely that only the highest priority layer will be sent, even if some less important packets could have been delivered without affecting the outcome of the future frames. As a result, the performance degrades with the increasing threshold value h and tops at around h=0.7.

The exact threshold value h at which packet selection provides optimum transmission performance depends upon channel conditions and may change for different video data streams. As packet selection has been described so far, it is possible that the packet selection system decides to skip the rest of a frame and start sending layer 0 of the next frame, but no packet of this new frame has yet arrived at the base-station. While waiting for these packets, the bandwidth, which is otherwise wasted, could have been used to deliver skipped packets. Simulation results indicate that the problem becomes more and more likely to occur as the threshold h increases. Thus, it is also responsible for the rapid degradation of performance as the threshold h approaches one.

One way of improving the efficiency of bandwidth usage in this situation is to go back and transmit packets that were previously skipped. This operation is referred to as "backing up" the transmission. Here, it is assumed that packets skipped are kept in the base-station buffer until after their play-out time or are replaced by newly arrived packets. As soon as the awaited high priority packet arrives, the original packet selection steps are resumed and the new packet is delivered. Transmission may be backed up whenever similar situations occur.

Figure 7:
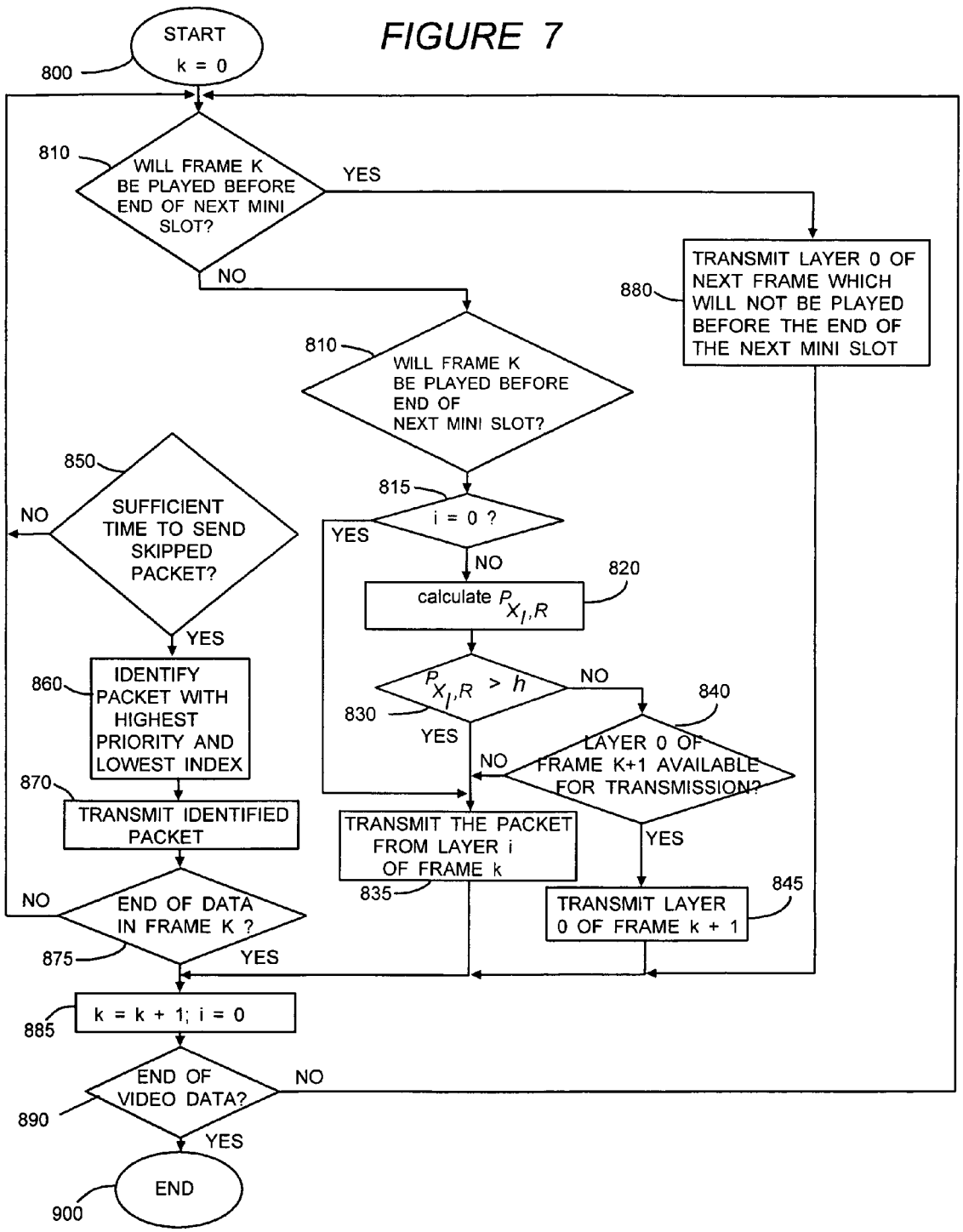
FIG. 7 illustrates an exemplary method of determining whether to transmit a packet by estimating the value of success probability including operation steps for backing up the transmission as used in the second exemplary embodiment.

If backing up is employed to further improve transmission, the method illustrated in FIG. 4 is altered to include additional steps as shown in FIG. 7. In this second exemplary embodiment shown in FIG. 7, the method begins in step 800 and control proceeds to step 810. In step 810, it is determined whether the frame k will be played before the end of the next mini slot. If frame k will not be played before the end of the next mini slot, control proceeds to step 812. Otherwise, control proceeds to step 900. In step 900, transmission of layer 0 of the next frame that will not be played before the end of the next mini slot is performed and control proceeds to step 910.

In step 812, it is determined whether layer 0 of frame k+1 or layer i of frame k is available for transmission. If so, control proceeds to step 815. Otherwise control proceeds to step 850, explained in detail below.

In step 815, it is determined whether i=0, indicating that the layer is layer 0. If i=0, control proceeds to step 835. If i is not equal to 0, control proceeds to step 820.

In step 820, $P_{X_i,R}$ is determined as the estimation of the minimum success probability in the same or a similar manner as that provided in steps 420-440 of FIG. 4. Subsequently, control proceeds to step 830. In step 830, a comparison of $P_{X_i,R}$ with a threshold h is performed to decide whether to transmit this packet or start sending a next frame. If $P_{X_i,R}$ is higher than the threshold h, control proceeds to step 835. Otherwise, control proceeds to step 840. In step 835, the packet from layer i of frame k is transmitted and control proceeds to step 885. In step 840, it is determined whether layer 0 of frame k+1 is available for transmission. If so, control proceeds to step 845 in which layer 0 of frame k+1 is transmitted and control proceeds to step 885. If not, control proceeds to step 835, in which, as explained above, the packet from layer i of frame k is transmitted and control proceeds to step 885.

As explained above, if it is determined, in step 812, that layer 0 of frame k+1 or layer i of frame k is not available for transmission, control proceeds to step 850. In step 850, it is determined whether there is sufficient time to send a skipped packet. If so, control proceeds to step 860. Otherwise, control proceeds to step 810. In step 860, the skipped packet with the highest priority and lowest index to deliver is identified and control proceeds to step 870. In step 870, the identified packet is transmitted to the client and control proceeds to step 875. In step 875, it is determined whether any data remains in frame k to be transmitted. If so, control returns to step 810. If not, control proceeds to step 885 in which k is incremented to the next frame and i is reset to 0. Control then proceeds to step 890.

In step 890, it is determined whether the end of the video data has been reached, i.e., whether any next packet is available for transmission. Step 890 serves the purpose of determining whether the end of the video data has been reached. In step 890, if there is remaining data to be transmitted, control returns to step 800. If step 890 determines that there is no remaining data to be transmitted, control proceeds to step 900 in which the method ends.

The backup procedure always chooses, among all the skipped packets, the one with highest priority and lowest index to deliver. Using a small threshold value h, the performance of the second embodiment is not much altered from the performance of the first embodiment. However, for higher thresholds h, performance improves significantly. For example, for some combinations of $p_{GG}$ and $p_{BB}$, the QI obtained with h=0.9 exceeds that when h=0.7.

Moreover, with such an improvement, the performance also becomes more stable. In particular, performance is within 1-3% of the optimum result over a relatively large load range, with h=0.7 and h=0.9. This large range makes it easier to select an appropriate threshold value h for different video data streams.

When h=0.1 with h=0.5-0.99 use of a very small threshold h results in consistently poor performance. This substantiates a conclusion that systems that do not implement packet selection as used in the present invention (equivalent to the case of h=0), such as conventional transmission systems, do not perform well.

The actual amount of improvement from implementing the packet selection provided by the exemplary embodiments depends upon the channel conditions and the selected threshold value h. Moreover, improvement is also generally higher for higher $p_{GG}$ and higher network loads.

Additionally, as system load increases, the QI sometimes increases with the load, while sometimes decreases with it, especially at h=0.9 and h=0.99. This correlation, or inverse correlation, phenomenon is even more apparent in another simulation that used a computer generated CBR video data file that included 4000 equal-sized frames and the size of a frame is 2000 bits. In each frame, 1000 bits were of the highest priority, and for the rest of 1000 bits, half were of priority 1 and the other half were priority 2. The simulation assumed a play-out period of 6 mini-slots. One frame was sent from the server, hence one was received at the base-station, every 6 mini-slots. The size of the wireless packet was 500 bits and that of a regular packet was equal to the frame size. The initial buffer occupancy at the client was 6000 which was exactly the total of the first three frames. The simulation was performed to investigate how QI changes with load by fixing the value of $p_{GG}$ and changing $p_{BB}$ for different thresholds h.

Results of this simulation with the threshold h being set at 0.7, 0.9, and 0.99, respectfully, show that most of the curves drop suddenly once or twice as the load increases from 0.6 to 2, and indicates that the reason why the QI curves drop suddenly at some points, when $p_{BB}$ exceeds certain value, is that almost an entire layer is lost.

The exact value of this critical point for $p_{BB}$ depends on $p_{GG}$ and threshold h. For instance, when threshold h equals 0.7, starting from $p_{BB}$=0.71, almost the entire layer 2 is dropped. When h=0.9, most of the layer 2 packets are dropped starting from $P_{BB}$=0.41; and from $p_{BB}$=0.71, all layer 1 packets are also dropped. While for h=0.99, the two drops take place even earlier at $p_{BB}$=0.11 and $p_{BB}$=0.31 respectively. Right after each drop, the number of packets transmitted in each layer changes very little as $p_{BB}$ increases. However, the load increases with $p_{BB}$, which means the best quality one can achieve from the system actually worsens rather than improves as $p_{BB}$ increase. Therefore, the relative performance of the system becomes better, the QI increases and the curve goes up with the load.

An explanation for these sudden drops is now provided. In the exemplary embodiments, as explained above, $P_{X_l,R}$ is calculated to determine which packet to deliver at the end of each mini-slot. For a long CBR video data stream, calculation of:

$$X_1 = \left\lceil \frac{(\text{layer 0 size} = \text{layer 1 size}) * (\text{number of frames left}) * R}{(\text{wireless packet size}) * (\text{number of mini-slots left})} \right\rceil$$

is performed to decide whether to select a layer 2 packet, and calculation of:

$$X_0 = \left\lceil \frac{(\text{layer 0 size} = \text{layer 1 size}) * (\text{number of frames left}) * R}{(\text{wireless packet size}) * (\text{number of mini-slots left})} \right\rceil$$

is performed to decide whether to select a layer 1 packet. For a CBR video data stream, the only factor that may vary in the above two formulas is the ratio between the number of remaining frames and the number of remaining mini-slots.

Since only one frame is sent from the server in every time slot, with a play-out delay of just 3 time slots, a packet does not arrive at the base station until a few time slots before its play-out time. Therefore, the ratio, $X_l$, does not change much during the entire play-out. As a result, the estimated success probability $P_{X_l,R}$ also does not change appreciably during the entire play-out. Therefore, with a fixed threshold h, it is likely that the minimum success probability of a layer remains either above or below the threshold h during the entire play-out. In the latter case, an entire layer is dropped. Since layer 2 packets need to consider one more layer than those of layer 1, their success probabilities are more likely to fall below the threshold h.

Therefore, the cause of these sudden drops is that, again, the system is waiting for higher priority packets which have not arrived at base-station, while it could be sending some skipped lower priority packets. As described previously, this problem is remedied by the second exemplary embodiment shown in FIG. 7.

The wireless channels used in the simulations can be fully characterized by the value of $p_{GG}$ and $p_{BB}$. A comparison of the performance of the exemplary embodiments of the invention under different system loads is now provided. This comparison explains how the performance is affected by $p_{GG}$ and $p_{BB}$, as well as how to select the threshold h to obtain better results.

Using the first exemplary embodiment of the invention, performance is generally better for small $p_{GG}$, i.e., when both good periods and bad periods are short, than for larger $p_{GG}$, i.e., when the system usually remains in the good state for a long time, but once in the bad state, does not return to the good state for a significant period of time. However, using the second exemplary embodiment, with a backup procedure incorporated, the difference between various combinations of $p_{GG}$ and $p_{BB}$ becomes almost negligible. This is especially true for h=0.7 and h=0.9. In other words, with a threshold h between 0.7 and 0.9, the transmission is performed close to optimum under most of the channel conditions. The only exception is when $p_{GG}$ is very high, e.g., above 0.99. The performing packet selection provides almost no performance improvement unless the threshold h is also set to be very high. In actual implementation, setting the threshold h between 0.7 and 0.9 will obtain near optimum performance in most cases. An exception is when $p_{GG}$ is close to 1, in which case the threshold h also needs to be set to be very close to 1.

Simulation results indicate that by selecting the threshold h appropriately, the first exemplary embodiment of the invention achieves within 5% of the optimum result under most channel conditions. Moreover, simulation results also indicate that implementing the second exemplary embodiment of the invention, which includes a backup procedure that uses an otherwise idle network to deliver skipped packets, further improves performance to within 1-3% of optimum transmission capability. Additionally, using the second exemplary embodiment of the invention provides a more stable system that is capable of using a large range of threshold values h under different network conditions. Therefore, the second exemplary embodiment of the invention allows more opportunity to choose thresholds h for different video data streams.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, the present invention may be employed with various coding schemes. Some coding schemes use interframe techniques. For instance, in MPEG, a B frame may need the I or P frame behind it in order to be decoded. Therefore, efficiently transmitting the B frame by itself does not improve video data quality if the corresponding I or P frames are missing. Therefore, the order in which compressed pictures are found in the video data stream may be different from the order in which they are played.

Initially, this might suggest that the present invention may not be utilized in such interframe coding schemes. However, the benefits of the present invention may be used in such coding schemes with minor modifications to the system and method.

Additionally, in the illustrative embodiment of the invention, a method of packet selection determines which packets to transmit based on predictions about how layers in the future frames may be delivered over wireless links. However, the present invention may also be used in connection video data transmission over the Internet. In such an application, bandwidth availability changes as channel conditions change over time. Therefore, the invention may be implemented at either a video server or some intermediate network switch. In such an implementation, an issue which must be addressed is that the delay of the feedback will become more significant and must be taken into account for predicting future network conditions.

Furthermore, although the exemplary embodiments involve transmission of data packets from a base station to client equipment over a wireless channel, e.g., base station 150 and wireless channel 155 in FIG. 1, it is foreseeable that the invention may be practiced in combination with transmission of data over any channels that suffer from dynamic channel conditions, e.g., noisy behavior. Therefore, the present invention is not limited to wireless channel applications or data transmission using a base station.

Moreover, it is foreseeable that the present invention is useful for improving data transmission for all types of streamed data and is not limited to video data.

While the present invention has been described with reference to specific illustrative embodiments, it is not confined to the specific details set forth, but is intended to cover such modifications or changes as may come within the scope of this invention.

What is claimed is:

1. A method of transmitting data packets comprising:
   identifying a priority of each packet of a plurality of packets to be transmitted;
   selectively transmitting higher priority packets before transmitting lower priority packets of the plurality of packets;
   receiving the transmitted packets;
   smoothing the received data packets; and
   playing-out the smoothed packets,
   wherein, the step of selectively transmitting is performed by calculating a probability of higher priority packets being delivered prior to play-out times for the higher priority packets and transmitting a packet only if this probability is greater than a set threshold
   and wherein calculating a probability of higher priority packets being delivered prior to play-out times for the higher priority packets is performed by estimating the success probability that a first data packet of the plurality of data packets will be delivered before the play-out time for the first data packet.

2. The method of transmitting data packets of claim 1, wherein the step of selectively transmitting is performed based on channel conditions of channels upon which the data packets are transmitted.

3. The method of data packet transmission of claim 1, wherein the step of smoothing the received data packets includes storing the received packets in a smoothing buffer and generating a transmission schedule, which includes the rates at which the data packets will be played-out.

4. The method of data packet transmission of claim 3, wherein generating the transmission schedule is performed based on a size of a buffer that will store received packets, available bandwidth and allowed play-out delay.

5. The method of data packet transmission of claim 3, wherein the transmission schedule is designed so that the smoothing buffer does not overflow or underflow during play-out of the received data packets.

6. The method of data packet transmission of claim 1, wherein the step of selectively transmitting performs transmission over wireless channels.

7. The method of data packet transmission of claim 1, wherein the set threshold is between 0.7 and 0.9.

8. A method of transmitting data packets comprising:
   identifying a priority of each packet of a plurality of packets to be transmitted;
   selectively transmitting higher priority packets before transmitting lower priority packets of the plurality of packets;
   receiving the transmitted packets;
   smoothing the received data packets; and
   playing-out the smoothed packets,
   wherein, the step of selectively transmitting is performed by calculating a probability of higher priority packets being delivered prior to play-out times for the higher priority packets and transmitting a packet only if this probability is greater than a set threshold, wherein the step of selectively transmitting transmits data from the plurality of data packets in mini-slots, and wherein calculating a probability of higher priority packets being delivered prior to play-out times for the higher priority packets is performed at an end of every mini-slot to determine whether to transmit data in a next mini-slot.

9. The method of data packet transmission of claim 8, wherein the plurality of data packets are video data packets.

* * * * *